United States Patent
Wright et al.

(10) Patent No.: US 8,482,424 B2
(45) Date of Patent: Jul. 9, 2013

(54) DIGITAL DISPLAY STAND FOR MATTRESSES

(75) Inventors: Ronald E. Wright, High Point, NC (US); Greg Wright, Greensboro, NC (US)

(73) Assignee: Wright of Thomasville, Inc., Thomasville, NC (US)

(*) Notice: Subject to any disclaimer, the term of this patent is extended or adjusted under 35 U.S.C. 154(b) by 534 days.

(21) Appl. No.: 12/845,153

(22) Filed: Jul. 28, 2010

(65) Prior Publication Data

US 2012/0025998 A1    Feb. 2, 2012

(51) Int. Cl.
G08B 21/00    (2006.01)

(52) U.S. Cl.
USPC .............. 340/686.6; 340/691.1; 340/691.6; 5/659

(58) Field of Classification Search
USPC .............. 340/686.6, 691.1, 691.6; 705/14.4, 705/410, 411; 345/204, 960; 40/584, 661.08, 40/611.01, 735, 765; 211/28; 5/659, 905
See application file for complete search history.

(56) References Cited

U.S. PATENT DOCUMENTS

| | | | |
|---|---|---|---|
| 5,009,379 A | 4/1991 | Sadler | |
| 6,408,554 B1 | 6/2002 | Przylucki | |
| 6,484,429 B1 | 11/2002 | Przylucki | |
| 6,801,185 B2 | 10/2004 | Salley | |
| 6,845,532 B1 | 1/2005 | Rosenblum | |
| 7,987,997 B2* | 8/2011 | Glogovsky, Jr. | ............... 211/28 |
| 2004/0103570 A1 | 6/2004 | Ruttenberg | |
| 2007/0294926 A1 | 12/2007 | Andersen et al. | |
| 2009/0223910 A1 | 9/2009 | Glogovsky, Jr. | |
| 2012/0299741 A1* | 11/2012 | Wright, Jr. | ............... 340/815.45 |

OTHER PUBLICATIONS

Industrial Image, Inc. FlashView Open Frame LCD, known at least as early as Jul. 27, 2010.
DigitalSinageToday.com article, sponsored by Industrial Image, Inc., entitled Small-Screen Displays in a Retail Environment, dated at least as early as Dec. 31, 2009.

* cited by examiner

*Primary Examiner* — Toan N Pham
(74) *Attorney, Agent, or Firm* — Womble Carlyle Sandridge & Rice, LLP

(57) ABSTRACT

A display device for use with a mattress in a showroom environment for presenting information regarding the mattress to a person. The display device comprises a base and standard extending generally upwardly from the base and including an upper display portion. The base is selectively placeable in association with the mattress whereby information concerning the asserted mattress will be visible to a customer considering the mattress. The stand includes a media player on the display portion for presenting product information regarding the mattress. The display stand includes a sensor in electronic communication with the media player. The sensor activates the media player responsive to the approach of a person to the digital display stand.

28 Claims, 3 Drawing Sheets

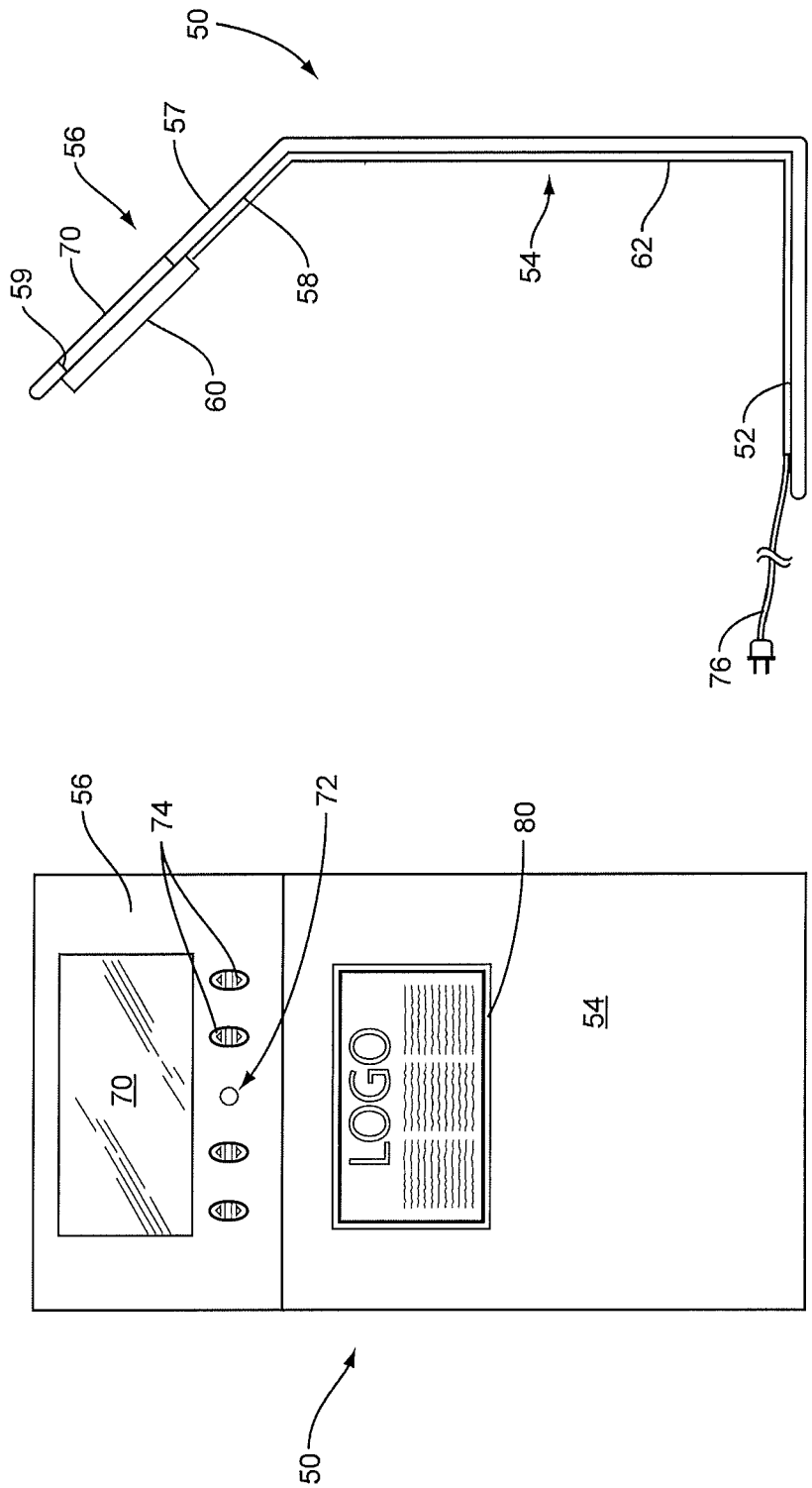

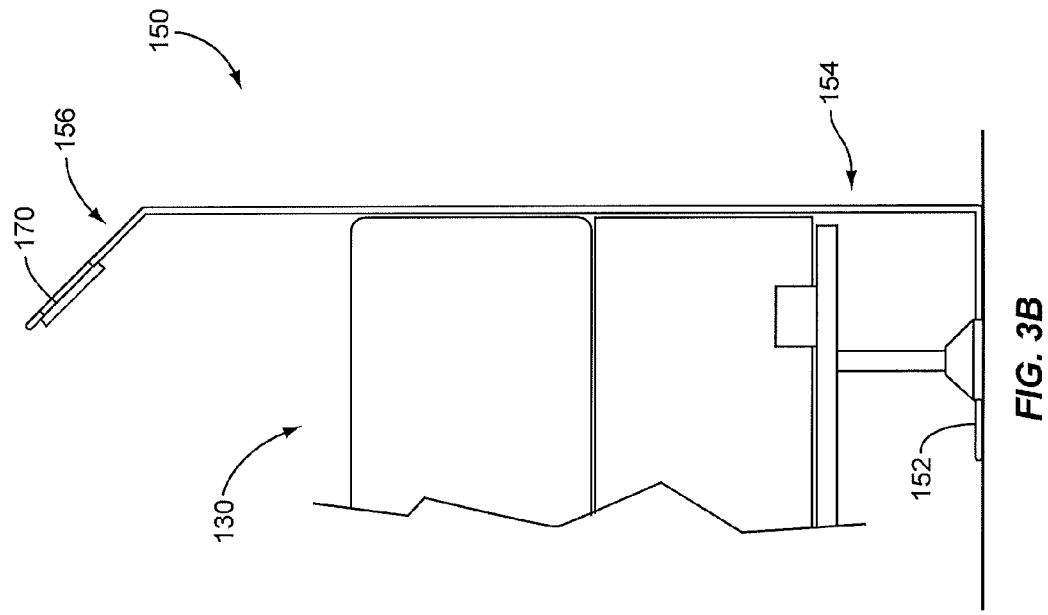
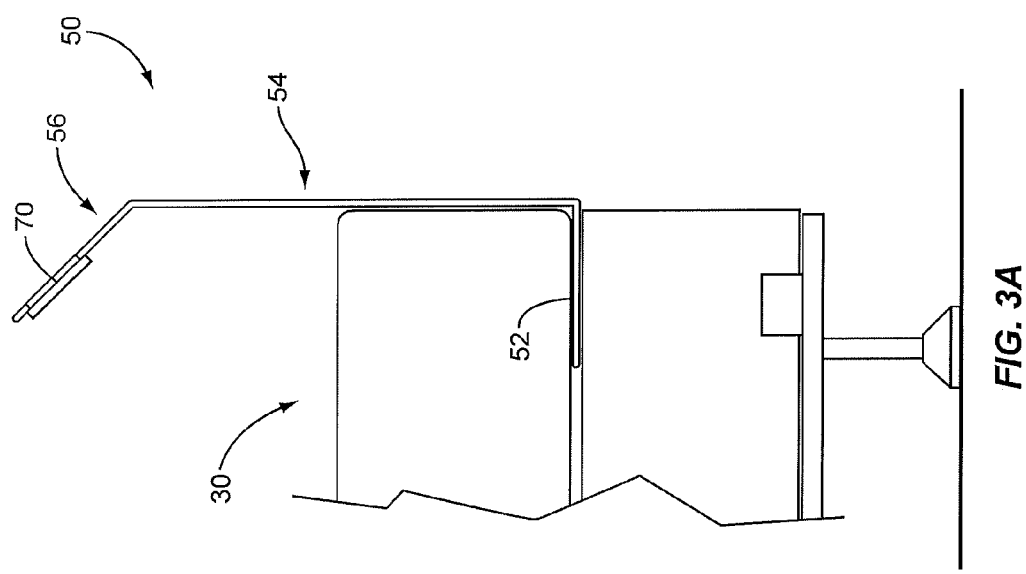

DIGITAL DISPLAY STAND FOR MATTRESSES

FIELD OF THE INVENTION

The present invention relates to the digital display stand for mattresses in a showroom environment.

BACKGROUND OF THE INVENTION

Mattresses are displayed in showrooms during the sale and distribution from the mattress manufacturer to the consumer. First of all, mattress manufacturers may display mattresses in wholesale showrooms so that retailers can get an idea of how the mattress will look in their own retail showrooms. In retail showrooms, display mattresses are arranged on the retail floor so that the prospective purchaser can peruse the various types of mattresses offered by that retailer. In each situation, marketing and/or technical features of the mattresses are communicated to the customer via signage, labels or a personal communication between the sales representative and the customer.

SUMMARY OF THE INVENTION

Applicant has determined that current methods of communicating product information in mattress showrooms to customers have limited effectiveness. Signs and labels, for example, are limited in terms of content, and also in visual impact on the customer. Any particular signage is effective only for one style of mattress, therefore, there must be signage stored for each different mattress offered for sale. Any change in information (style, price, etc.) about a particular mattress requires a change in the signage. Sales representatives may be busy with other customers, and cannot always devote time to present information to the other customers or otherwise facilitate the decision to purchase a mattress. Further, some customers may prefer evaluating mattresses without the help of a sales representative. Thus, there is a need for an improved way to communicate information about a mattress to a prospective customer. The inventors have recognized this need, and developed an improvement in display devices for mattresses for use in showrooms, and a system for displaying product information regarding a mattress to a person. In particular, a digital display device has been developed that is used with mattress sets in a showroom environment.

According to an illustrated embodiment of the invention, the display device may be in the form of a stand that includes a base and a generally vertical wall or standard extending generally upwardly from the base, and an upper display portion. The base is selectively placeable beneath, beside, or in association with a mattress so that the wall is proximate the end of the mattress. The device includes a media player on the display portion for presenting selectively changeable product information regarding the mattress to a person approaching the mattress. The display device also includes a sensor in electronic communication with the media player. The sensor activates the media player responsive to the approach of a person to the digital display stand.

While the device described above is one approach to presenting product information, other stands or devices used at the mattress site in conjunction with the mattress is also a possibility.

According to another embodiment of the invention, a system has been developed for selectively presenting product information regarding a mattress to a person in a showroom environment. The system includes a showroom, one or more mattresses arranged in the showroom, and a display device or devices. Each display device includes a base and a generally vertical wall or standard extending generally upwardly from the base, and an upper display portion. A media player is on the display portion for presenting selectively changeable product information regarding the mattress to a person approaching the device. The device includes a sensor in electronic communication with the media player which activates the media player responsive to the approach of a person to the display device. The display device is selectively placeable near a mattress, or alternatively, on the mattress so that the wall is proximate the mattress side and the upper display portion is in the field of view of the person approaching the mattress.

These and other features, aspects, and advantages of the invention will be apparent from a reading of the following detailed description together with the accompanying drawings, which are briefly described below.

BRIEF DESCRIPTION OF THE DRAWINGS

FIGS. 2A and 2B are front and side views of a digital display device.

FIGS. 3A and 3B are side views of exemplary embodiments of a digital display devices used with a mattress.

DETAILED DESCRIPTION

Figure 1:
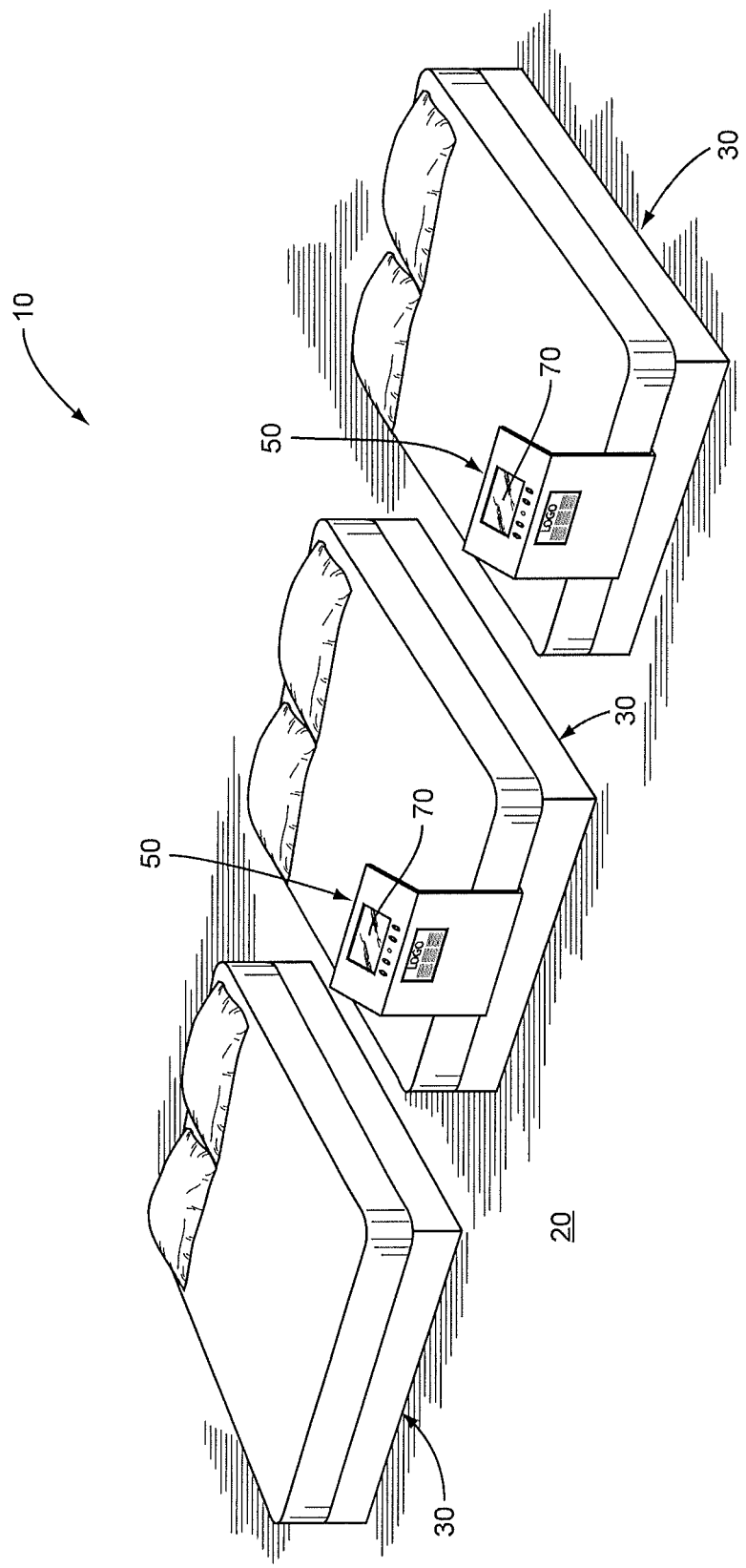
FIG. 1 is a perspective view of a digital display devices used with or on mattresses in a showroom.

Certain exemplary embodiments of the present invention are described below and illustrated in the accompanying figures. The embodiments described are only for purposes of illustrating the present invention and should not be interpreted as limiting the scope of the invention, which, of course, is limited only by the claims below. Other embodiments of the invention, and certain modifications and improvements of the described embodiments, will occur to those skilled in the art and all such alternate embodiments, modifications, and improvements are within the scope of the present invention.

According to common practice, the various features of the drawings discussed below are not necessarily drawn to scale. Dimensions of various features and elements in the drawings may be expanded or reduced to more clearly illustrate the embodiments of the invention.

FIG. 1 illustrates a system 10 including a showroom 20 with plurality of mattresses 30 arranged therein and at least one display device 50 in association with one or more of the mattresses. As can be seen in FIG. 1, an exemplary display device 50 may be a stand that includes the media player 70 for presenting selectively changeable information (also referred to herein as content or video content) to a person that approaches the display device. A "showroom" refers to a space used by mattress manufacturers to display new mattresses to their own customers, such as mattress retailers, or to retailers generally. In addition, a showroom includes retail showrooms where consumers come to purchase mattresses.

FIGS. 2A and 2B show an exemplary device 50 of the present invention. In a preferred embodiment, the device 50 may be a display stand that includes a base 52 and a generally vertical standard 54 extending generally upwardly from the base 52. In an embodiment, the base 52 may be a generally horizontal member. The standard may be a wall, leg, post, panel, member or other structure. The standard 54 includes an upper display portion 56 shown in FIGS. 2A and 2B angled over and extending at least partially over the base 52. In a preferred embodiment, the upper display portion 56 is positioned at about a 45 degree angle with respect to a line parallel to the base 52 and orthogonal to the standard 54. However, the upper display portion 56 may have any angle which allows a person to readily view content displayed on the media player 70. Accordingly, the upper display portion 56 may continue upwardly without any angle at all and remain generally perpendicular to the base 52.

The device may be formed into the desired shape so that when placed in association with the mattress, a person approaching the mattress can readily observe the media player thereon. In a preferred embodiment, the base, standard and upper display portion are integrally formed. In other embodiments, the device may comprise separate pieces that are combined by known methods, fasteners, or interlocking joints, and the like.

The device, and in particular, the base, standard and upper display portion, may be formed of plastic, metallic alloys (e.g., steel, aluminum, sheet metal), wood based materials or a composite material.

As shown in FIG. 2A, the display stand device 50 may also include a removable sign 80 (shown on standard 54) with additional information regarding the mattress 30 thereon.

As shown in FIGS. 2A and 2B, the display device 50 includes a media player 70, a sensor 72 and various programmable control buttons 74 in electronic communication with the media player 70. The control buttons 74 may be used to program the presentation of the selectively changeable product information on the media player.

As shown in the Figures, the media player 70 is located at or on the upper display portion 56. The media player presents selectively changeable product information to a person that approaches the display device 50. For example, the sensor activates the media player when a person approaches the display device 50 as will be discussed below.

In a preferred embodiment, the display device 50 includes a housing 60 that holds the media player 70 therein. The upper display portion 56 has an opening 59 (shown in FIG. 2B) that extends between the front 57 and rear 58 surface thereof. The housing 60 is secured to the upper display portion 56 at the opening 59 so that the media player is exposed on the upper display portion 56. In an embodiment, the media player's front surface is generally co-planar with the front surface 57 of the upper display portion 56. The media player however, may be just below or raised above the front surface 57.

The media player may be any device that displays selectively changeable video content, presentations, images, or any other audio, video or audio/visual content. The media player 70 may play file formats including, but not limited to, MPEG, JPEG, MJPEG, DVIZ, XVIS, AVI or DVD and HDDVD formats. The media player may display HD formats in 480p, 480i, 720p, 1080p, 1080i or 1086, or other formats. The media player 70 displays content stored in a computer memory in the player 70, in a removable computer memory, received via a cable (e.g., HDMI, ethernet, coaxial, videos, AIV, etc.), or received wirelessly over a communications network. In such an embodiment, the media player may include a transmitter/antenna for receiving the wireless signal. The media player may be battery powered, or use a conventional power cord 76 (shown in FIG. 2B) for connection to an external power source. In one embodiment, the media player is an LCD screen that includes a processor for displaying content on the LCD screen, e.g., FlashView Open-Frame LCD, Model no. FV0F7-L1, available from Industrial Image Inc. In other embodiments, a touch screen may used to allow a person to control and/or program the content of the presentation in the media player 70.

The sensor 72 may be any type of sensor that can activate the media player 70 responsive to the approach of a person. In one embodiment, sensor 72 is a motion sensor that detects the presence of an object or activity within a prescribed range. In a preferred embodiment, the sensor 72 detects movement within about three (3) feet from the device. However, other sensors may be used that have range greater than three (3) feet from the device. In use, the motion sensor may be a passive pyroelectric infrared sensor. For example, an infrared source, such as a human body, can enter the field of view and emit infrared energy towards the motion sensor. The motion sensor receives the infrared source and sends a signal to the media player 70. A passive infrared sensor is shown in FIG. 2A. In alternate embodiments, however, other sensors such as ultrasonic or microwave sensors may be used for motion detection.

As shown in FIG. 2B, a wire housing 62 begins proximate the housing 60 on the display stand 50 and extends down the rear side of the standard 54 toward the base 52. The wire housing 62 routes and protects various wires emanating from the media player 70, e.g., power cords, ethernet cables, coaxial cable, A/V cables, S-video cables, HDMI wires, etc. In a preferred embodiment, the wire housing may be a hook and loop fastener casing. For example, VELCRO brand fasteners may be used to contain and protect the wires, In other embodiments, the wire housing 62 may be some other structure for protecting the wires.

Turning now to FIGS. 3A and 3B, several exemplary implementations of the present invention are shown. In the embodiment shown in FIG. 3A, the display stand 50 is placed between the components of a mattress set so that the base 52 slides beneath the mattress and above the box spring. The standard 54 may be adjacent the mattress 30 while the upper display portion 56 and media player 70 extend over the top of the mattress 30. In an embodiments, the standard extends upwardly from the base a distance that is greater than or about equal to the thickness of a mattress. Turning now to FIG. 3B, the display device 150 is shown with the base 152 resting on the floor associated with the mattress 130. Therefore, the display device 150 is not required to be connected or touching the mattresses 130. Rather, in another embodiment, the display device 150 may be proximate or near the general area of the mattress in a showroom. For example, the device may be placed on the mattress. In other alternative embodiments, the standard including the media player and sensor may be placed on furniture in association with the mattress.

Although the present invention has been described with exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

What is claimed is:

1. A display device for use with a mattress, each having a top, side and thickness, in a showroom environment for presenting selectively changeable product information regarding the mattress to a person, the display device comprising:

a base and a generally vertical standard extending generally upwardly from the base and including an upper display portion;

the base selectively placeable in association with the mattress whereby information concerning the associated mattress will be visible to the person considering the mattress;

a media player on the display portion for presenting the selectively changeable product information regarding the mattress; and a sensor in electronic communication with the media player, the sensor activating the media player responsive to the approach of the person to the digital display device.

2. The display device of claim 1, wherein the standard is a generally vertical wall extending generally upwardly from a side of the base and including the upper display portion, the base selectively placeable between the mattress and box spring so that the wall is proximate the side of the mattress and the upper display portion extends above the mattress.

3. The display device of claim 2, wherein the display portion extends upwardly at an angle from and at least partially over the base.

4. The display device of claim 3, wherein the base is a generally horizontally planar member placed beneath the mattress.

5. The display device of claim 2, wherein the standard extends upwardly from the base a distance that is greater than or about equal to the thickness of the mattress.

6. The display device of claim 1, wherein the upper display portion has an opening extending between a front and rear surface thereof, a housing attached to the upper display portion at the opening and holding the media player at least partially in the housing so that the media player is on the front of the upper display portion.

7. The display device of claim 1, wherein the media player includes at least one control button for programming the presentation of the selectively changeable product information on the media player.

8. The display device of claim 1, wherein the display stand includes a means for protecting wires that are in electronic communication with the media player.

9. The display device of claim 1, wherein the display device includes a wire housing that contains a portion of the wires that are in electronic communication with the media player.

10. The display device of claim 1, wherein the display device has hook and loop fasteners that contains a portion of the wires that are in electronic communication with the media player.

11. The display device of claim 1, wherein the display stand includes a removable sign.

12. The display device of claim 1, wherein the base, standard and upper display portion are integrally formed.

13. The display device of claim 1, wherein the base, standard, and upper display portions are formed from the group consisting of plastic, metallic alloys, wood based materials, composite materials, and combinations thereof.

14. The display device of claim 1, wherein the motion sensor activates the media player when the customer is within about three feet from the display stand.

15. A system for presenting information to a person in a mattress showroom environment, the system comprising:
a showroom;
one or more mattresses, each having a top, side and thickness, arranged in the showroom; and
a display device comprising a base and a generally vertical standard extending generally upwardly from the base and including an upper display portion;
the base selectively placeable in association with the mattress whereby information concerning the associated mattress will be visible to the person considering the mattress;
a media player on the display portion for presenting the selectively changeable product information regarding the mattress; and
a sensor in electronic communication with the media player, the sensor activating the media player responsive to the approach of a person to the display device.

16. The system of claim 15, wherein the standard is a generally vertical wall extending generally upwardly from a side of the base and including the upper display portion, the base selectively placeable between the mattress and box spring so that the wall is proximate the side of the mattress and the upper display portion extends above the mattress.

17. The system of claim 16, wherein the display portion extends upwardly at an angle from and at least partially over the base.

18. The system of claim 17, wherein when the base is placed beneath the mattress, the display portion extends at least partially over the top of the mattress.

19. The system of claim 16, wherein the standard extends upwardly from the base a distance that is greater than or about equal to the thickness of a mattress.

20. The display stand of claim 15, wherein the upper display portion has an opening extending between a front and rear surface thereof, a housing attached to the upper display portion at the opening and holding the media player at least partially in the housing so that the media player is on the front of the upper display portion.

21. The system of claim 15, wherein the media player includes at least one control button for programming the presentation of the selectively changeable product information on the media player.

22. The system of claim 15, wherein the display device includes a means for protecting wires that are in electronic communication with the media player.

23. The system of claim 15, wherein the display device includes a wire housing that contains a portion of the wires that are in electronic communication with the media player.

24. The system of claim 15, wherein the display device has hook and loop fasteners that contains a portion of the wires that are in electronic communication with the media player.

25. The system of claim 15, wherein the display device includes a removable sign.

26. The system of claim 15, wherein the base, standard and upper display portion are integrally formed.

27. The system of claim 15, wherein the base, wall, and upper display portions are formed from the group consisting of plastic, metallic alloys, wood based materials, composite materials, and combinations thereof.

28. The system of claim 15, wherein the motion sensor activates the media player when the customer is within about three feet from the display stand.

* * * * *